United States Patent [19]

Kranz et al.

[11] Patent Number: 4,556,320

[45] Date of Patent: Dec. 3, 1985

[54] LASER ROTATION RATE SENSOR

[75] Inventors: Jakob Kranz; Joachim Kaiser, both of Düsseldorf; Hans-Bertram Wiegemann, Schriesheim; Klaus U. Baron, Heidelberg, all of Fed. Rep. of Germany

[73] Assignee: TELDIX GmbH, Heidelberg, Fed. Rep. of Germany

[21] Appl. No.: 468,059

[22] PCT Filed: Jun. 10, 1982

[86] PCT No.: PCT/EP82/00122
§ 371 Date: Feb. 9, 1983
§ 102(e) Date: Feb. 9, 1983

[87] PCT Pub. No.: WO82/04483
PCT Pub. Date: Dec. 23, 1982

[30] Foreign Application Priority Data

Jun. 13, 1981 [DE] Fed. Rep. of Germany ....... 3123518

[51] Int. Cl.⁴ .............................................. G01C 19/64
[52] U.S. Cl. ..................... 356/350; 350/377
[58] Field of Search ........................ 356/350; 372/94; 350/376, 377, 385, 394, 395

[56] References Cited

U.S. PATENT DOCUMENTS

| | | |
|---|---|---|
| 3,474,428 | 10/1969 | Nelson et al. ................... 350/377 X |
| 3,545,866 | 12/1970 | Jacobs et al. . |
| 3,594,064 | 7/1971 | Bierlein ........................... 350/377 X |
| 3,649,931 | 3/1972 | Macek . |
| 3,752,586 | 8/1973 | Hutchings et al. . |
| 3,851,973 | 12/1974 | Macek . |
| 4,195,908 | 5/1978 | Kestigian et al. . |
| 4,225,239 | 9/1980 | Prinz . |

FOREIGN PATENT DOCUMENTS 2432479 1/1976 Fed. Rep. of Germany .

Primary Examiner—Vincent P. McGraw
Attorney, Agent, or Firm—Spencer & Frank

[57] ABSTRACT

The invention relates to a laser rotation rate sensor wherein two light beams counterrotate in a polygon equipped with reflectors at its corners, a signal depending on the rate of rotation being derived from the frequency difference. One of the reflectors employed is designed as a magneto-optic element so as to suppress lock-in. This reflector includes a prism whose base boundary face is provided with a layer of a material having a lower index of refraction than the prism material. At least one of these materials is a gyrotropic material. Almost no reflection occurs when light enters the prism at the two lateral faces due to adherence to the Brewster condition. Further, the angle of incidence of the beams on the interface with the layer having a lower index of refraction than the prism material is so large that total reflection occurs.

15 Claims, 4 Drawing Figures

LASER ROTATION RATE SENSOR

BACKGROUND OF THE INVENTION

The invention relates to a laser rotation rate sensor in which two light beams counterrotate in a polygon equipped with reflectors which depends its corners, a signal being derived in on the rate of rotation from the frequency difference. The device further includes, for lock-in suppression, a reflector which is designed and operated as a magnetooptic element.

It is known that laser rotation rate sensors can be used to measure inertial rotation rates in that the difference in frequency between counterpropagating electromagnetic waves is determined. It is further known that this frequency difference disappears at input rotation rates below a certain threshold value and that thus the rotation rate sensor loses its ability to measure low rotation rates. This phenomenon is called the lock-in effect. To avoid the lock-in effect, various measures have been developed which, in principle, are all based on the fact that a zero frequency split is forced onto the ring laser or—in other words—that its operating point is placed at a point outside the lock-in band.

One of these measures is the use of the magnetooptic Kerr effect. In this case, a nonreciprocal (i.e. direction dependent) phase shift is forced onto the light when it is reflected at the interface between two media of which at least one must be gyrotropic.

Thus, a phase shift difference is generated between the counterpropagating waves of such a rotation rate sensor and this phase shift difference leads to the above-mentioned desired zero frequency split according to the following equation:

$$\Delta \nu = (\Delta \phi / 2\pi(c/L))$$

where
 $\Delta \nu$ = the frequency difference;
 $\Delta \phi$ = the phase shift difference;
 c = the speed of light;
 L = the length of the rotational path.

A corresponding arangement is known from U.S. Pat. No. 4,225,239. In that patent, a magnetooptic metal mirror is inserted in the beam path in addition to the conventional corner mirrors and the beams impinge on that mirror in a grazing manner.

Such a magnetic mirror, in addition to having a sufficient Kerr effect, must also have a sufficiently high reflection capability to be able to serve as a resonator mirror. Both these requirements prevent the use of purely metal mirrors made of ferromagnetic material which, although having a sufficient Kerr effect, do not have a reflection capability sufficient for the above-mentioned use (typical reflection values lie between 40 and 70%). To overcome this drawback, U.S. Pat. No. 4,225,239 teaches that the reflection capability of the pure metal surface can be increased by applying dielectric coatings. However, this reduces the Kerr effect of such a mirror to a considerable degree since, due to reflection in the dielectric layers, only a fraction of the incident electromagnetic wave reaches the magnetized layer.

The Kerr mirror design disclosed in German Offenlegungsschrift No. DE-OS 2,432,479, which comprises an alternating sequence of quarter-wave-length layers of a dielectric material and of a ferromagnetic material, has been found to be technologically difficult to realize.

To overcome this technological difficulties, German Offenlegungsschrift DE-OS No. 2,919,590 and U.S. Pat. No. 4,195,908 teach an arrangement whereby a gyrotropic garnet layer is located in front of a dielectric layer system. However, the construction of such a mirror requires provision of a plate of a nonmagnetized garnet material having a gyromagnetic layer and subsequent dielectric layers applied in a suitable manner to the side of the garnet material facing away from the radiation source. Therefore, in spite of antireflection coatings on the side facing the radiation, reflection losses cannot be avoided, nor can absorption losses be avoided in the garnet material itself.

A further drawback of all previously proposed Kerr mirrors is that, in order to maintain the necessary polarization states of the electromagnetic radiation, special additional measures must be taken in the resonator.

Moreover, the manufacture of dielectric layer systems having high degrees of reflection is more difficult for p polarized light, as it is used, for example, for the magnetooptic Kerr effect with transverse orientation of the magnetic field (magnetic field vector perpendicular to the plane of beam incidence) than, for example, for s polarized light.

The object of the invention is to provide a magnetooptic element which, by utilization of the magnetooptic Kerr effect, generates the largest possible phase shift difference and, as a consequence thereof, the greatest possible frequency split of the counterrotating electromagnetic waves, and which exhibits high reflectivity for the laser radiation employed.

SUMMARY OF THE INVENTION

This problem is solved in that the reflector designed as the magnetooptic element includes a prism whose base boundary face is provided with a layer of a material which has a smaller index of refraction than the prism material; that at least one of these materials is a gyrotropic material; and that the angle of incidence of the radiation on the interface with the layer having the lower index of refraction is so large that total reflection occurs. The solution according to the invention is preferably utilized with p polarized light.

Additionally, if the Brewster condition is also met, the solution according to the invention has the advantage that the desired polarization state of the electromagnetic waves is maintained without further auxiliary means and that it is easy to manufacture.

As mentioned above, either the prism itself or the adjacent layer may be made of gyrotropic material or both materials may be gyrotropic; the magnetic field acts on this material so that it produces the magnetooptic Kerr effect.

In contradistinction to the arrangement disclosed in the above-mentioned U.S. Pat. No. 4,225,239, the reflector according to the invention is used as a corner reflector in triangular or square circulation paths and not as an additional reflector. The use of prisms instead of mirrors as reflectors is known per se (U.S. Pat. No. 3,545,866). The significance of the invention, however, is that such a prism is incorporated in a magnetooptic element while utilizing the effect of weakened total reflection.

If the layer disposed at the base boundary face of the prism is made of a gyrotropic material, the requirement that a gyrotropic material be used which has an index of refraction that is much lower than that of the prism material, constitutes a limitation of the number of substances that can be employed, since generally most gyrotropic substances have a high index of refraction. This makes it difficult, to say the least, locate a substance that also has the greatest possible Faraday rotation and the lowest possible absorption.

Embodiments of the invention are therefore directed to modification of the proposed solution to the extent that the significance of this requirement for a certain index of refraction of the gyrotropic material becomes less important and thus the gyrotropic material can be selected primarily with regard to the other requirements.

In one embodiment the layer bordering the base boundary face of the prism is designed as a multiple layer. On the one hand, the partial layer directly adjacent the base boundary face of the prism is made of gyrotropic material, but the index of refraction of this layer is equal to or greater than that of the prism and, moreover, it is followed by a second layer of dielectric material which has an index of refraction lower than the prism. The prism aperture is equal to the index of refraction of the prism multiplied by the sine of the angle of incidence of the light impinging on the prism. In this case, total reflection occurs at the interface between the gyrotropic layer and the dielectric layer with the light penetrating the gyrotropic material which now has low absorption. Thus it is possible to influence the phase of the light by means of the magnetic field.

The second layer may also be air or a vacuum.

In another embodiment, the base face of the prism borders at a dielectric layer having a lower index of refraction. This layer rests against the second layer of gyrotropic material into which, if the thickness of the first layer is selected in a suitable manner, a sufficient portion of the transversely attenuated wave generated during total reflection at the interface between the prism and the first layer can enter. With suitable magnetization of the gyrotropic layer, this then results in the desired phase influence.

If, in this case, the index of refraction of the gyrotropic material is less than the prism aperture, the light will likewise propagate as a transversely attenuated wave in the gyrotropic material. To maximize this phase shift difference, the gyrotropic layer should be thicker than the penetration depth of the transversely attenuated wave propagating therein. This penetration depth is about one to two wavelengths of the light employed.

If, however, the index of refraction of the gyrotropic material is greater than the prism aperture, then the thickness of the gyrotropic layer must be optimized in such a manner that a maximum phase shift difference is realized. A further increase in the phase shift difference can be realized in this case in that a third layer of dielectric material follows the gyrotropic layer. Such a double-sided coverage of the gyrotropic layer with dielectric layers can now be accomplished in that the Kerr effects leading to the phase shift difference mutually reinforce themselves during reflection at the upper and lower boundary faces of the gyrotropic layer.

Figure 1:
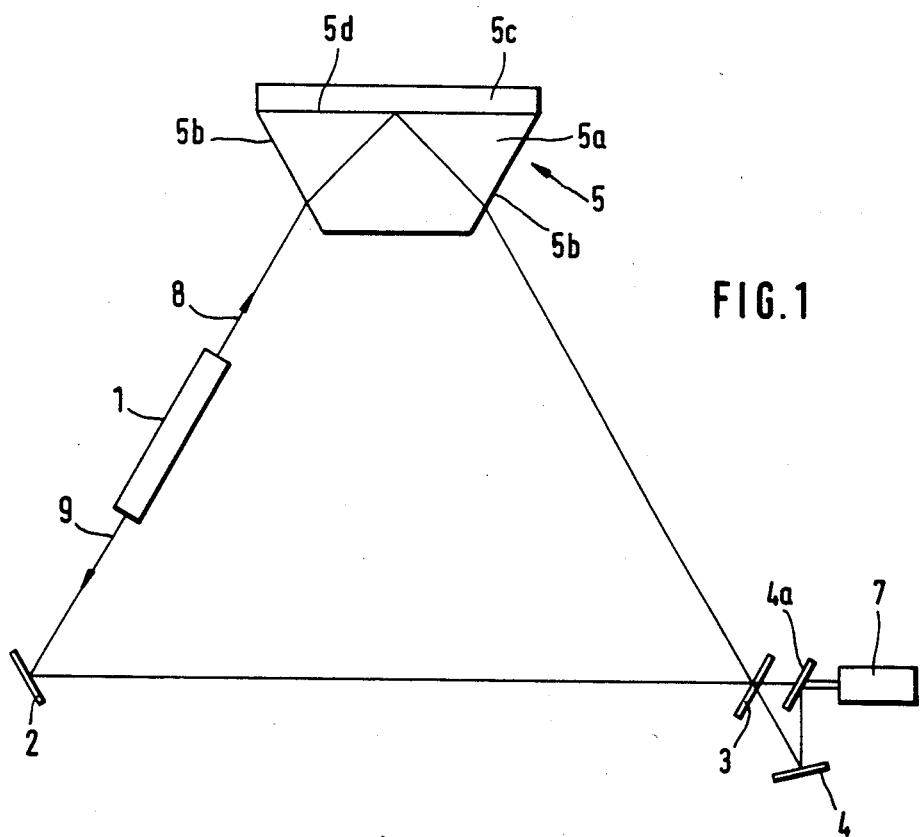
FIG. 1, shows a laser rotation rate sensor including a reflector according to the invention with a single layer at the base boundary face of the prism.

The rotation rate sensor shown in FIG. 1 includes an optical amplifier 1, a mirror 2, a partially transmissive mirror 3, a further mirror 4, a beam divider 4a, a reflector 5 and an optical detector 7 for measuring the frequency difference of the waves. The counterrotating laser beams are designated 8 and 9. Reflectors 2, 3 and 5 are designed and arranged in such a manner that the illustrated rotary paths are created. Beam 9 is reflected at mirror 2, partially reflected by mirror 3 and the remaining portion of the beam is returned by reflector 5 to optical amplifier 1. The portion passing through mirror 3 reaches detector 7.

Beam 8 is deflected in reflector 5, is partially deflected to mirror 2 by the partially transmissive mirror 3 and is returned from mirror 2 to the optical amplifier. The portion passing through the partially transmissive mirror is directed by mirror 4 onto beam divider 4a and a part thereof is likewise deflected toward detector 7.

In order to suppress the lock-in effect, reflector 5 is designed in a special manner. It includes a prism 5a (e.g. made of strontium titanate) having a certain index of refraction $n_1$; the lateral faces 5b of the prism are inclined in such a manner that, due to meeting the Brewster condition, the generated p polarized beams (8 or 9, respectively) are not reflected. A layer 5c of a gyrotropic material, e.g. ferrimagnetic garnet material, is applied to the base face 5d of the prism; this material has an index of refraction $n_2$ which is less than the aperture in the prism 5a. Thus, there will occur a weakened total reflection of the beams at the interface 5d between prism 5a and layer 5c. A small portion of the light enters the gyrotropic layer to a slight depth. Since, as a consequence of this, and due to the applied magnetic field (perpendicular to the plane of the drawing and not shown) there occurs a Kerr effect, the beams (9 and 8) experience different shifts in phase. This makes it possible to sense even low rotational rates of the arrangement.

Figure 2:
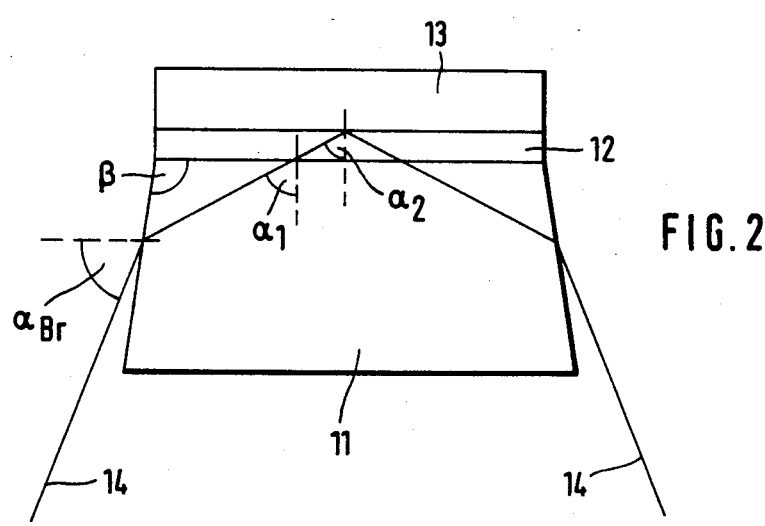
FIGS. 2–4, other embodiments of the reflector 5 of the rotation rate sensor of FIG. 1 with multiple layers.

FIG. 2 shows a differently designed reflector which may replace reflector 5 of FIG. 1. This reflector includes the coupling prism 11 of dielectric material (index of refraction $n_1$) and the angle $\beta$, the gyrotropic layer 12 (index of refraction $n_2$) applied thereonto, and an additional dielectric layer 13 (index of refraction $n_3$).

The laser beams 14 impinge on the lateral faces of the coupling prism 11 (made e.g. of glass) at the Brewster angle $\alpha_{Br}$ and, due to the greater density ($n_1$) of the prism material, are refracted toward the perpendicular. They impinge on layer 12 (made, for example, of ferromagnetic garnet material) at the angle $\alpha_1$ and, since the index of refraction ($n_2$) of the gyrotropic material is greater there, are refracted again toward the perpendicular. Thereafter, they impinge on layer 13 at the angle $\alpha_2$ and, since the material (e.g. cryolite, $MgF_2$) of this dielectric layer has a clearly smaller index of refraction ($n_3$) (e.g. close to 1.0), total reflection occurs at the interface between layers 12 and 13. The magnetization of layer 12 produces a nonreciprocal phase influence on the counterpropagating waves and thus the desired phase shift difference.

An index of refraction of close to one is given above for the dielectric layer. It should be noted in this connection that layer 13 may also be ambient air or an ambient vacuum for which the condition of the index of refraction being close to one or equal to one applies. However, a distinct layer of a solid dielectric material may also be utilized. The thickness of layer 12 of gyrotropic material must be selected in such a manner that the Kerr effects leading to the phase shift difference during reflection at the upper and lower interfaces of the gyrotropic layer 12 mutually reinforce themselves. For optimization, care must be taken that the absorption losses of reflector 5 increase monotonically with the thickness $d_2$ of layer 12 and the resulting phase shift difference is periodic in the thickness of layer 12.

The following comments apply to the above-mentioned angles and refractive indices:

$\alpha_{Br} = \arc \tan n_1$ $\beta = \alpha_0 + \alpha_{Br}$ $2\alpha_0 =$ beam deflection angle effected by reflector 5 (e.g. 60°)

Figure 3:
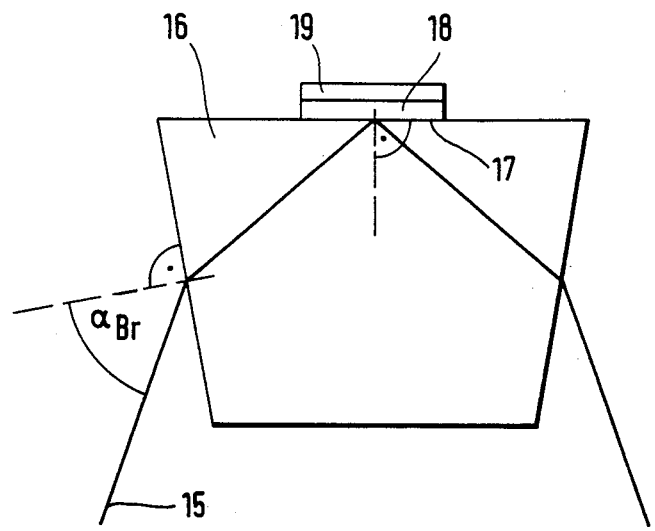

$\alpha_1 = \beta - \arc \sin (\sin \alpha_{Br}/n_1)$ $\alpha_2 = \arc \sin (n_1 \sin \alpha_1/n_2)$ $n_3 < n_1 \cdot \sin \alpha_1 =$ prism aperture In the embodiment of FIG. 3, the light beam 15 enters prism 16 at the Brewster angle $\alpha_{Br}$ so as to avoid reflection losses. Prism 16 is made of commercially available glasses having a suitable index of refraction, such as, for example, boron crown glass, heavy flint, strontium titanate, zirconium dioxide, quartz or the like. To avoid reflection losses, the entrance faces of the prism may also be demirrored. The beam impinges on the interface 17 with the dielectric layer 18 where it is totally reflected—if the material of layer 18 has a sufficiently low index of refraction—and is deflected by the desired angle. The transversely attenuated wave generated during total reflection propagates along interface 17. Its field intensity in layer 18 decreases exponentially with the distance from interface 17, but—if the thickness of layer 18 is selected to be suitably small (in the order of magnitude of 10 nm)—still extends into gyrotropic layer 19. The thickness of the gyrotropic layer 19 must here be selected in accordance with the ratio of its index of refraction to the prism aperture. With suitable magnetization of medium 19, a nonreciprocal phase influence on the part of the counterpropagating waves generates the desired phase shift difference.

Figure 4:
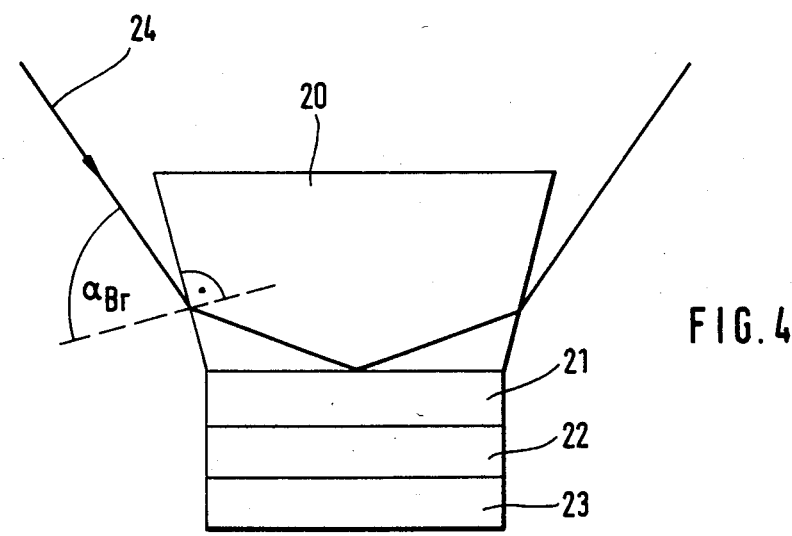

The embodiment of FIG. 4 includes three layers. Here again, light beam 24 enters prism 20 at the Brewster angle $\alpha_{Br}$. The index of refraction of the dielectric layer adjacent the prism base is selected to be so small that total reflection occurs at the interface between prism 20 and dielectric layer 21. The gyrotropic layer 22 is followed by a further dielectric layer 23. The structure of layers 21, 22, 23 with respect to thickness and index of refraction is selected in such a manner that the Kerr effects occurring due to the magnetic field mutually reinforce one another during reflection at the upper and lower interfaces of the gyrotropic layer.

We claim:

1. A laser rotation rate sensor wherein two light beams counterrotate in a polygon equipped with reflectors in its corners, a signal being derived from the frequency difference which depends on the rate of rotation, said rotation rate sensor further including a reflector comprising a magneto-optic element for the suppression of lock-in, characterized in that said reflector includes a prism whose base boundary face is provided with a layer of a material having a lower index of refraction than the prism material; that at least one of said materials is a gyrotropic material; and that the angle of incidence of the beams on the interface with respect to the layer having the lower index of refraction is so large that total reflection occurs.

2. A laser rotation rate sensor according to claim 1, characterized in that the layer adjacent the base boundary face of the prism is a double layer; the directly adjacent portion of the double layer is made of a dielectric material, having an index of refraction which is so much lower than that of the prism material that total reflection occurs at the interface toward the dielectric layer; that this dielectric layer is followed by a layer of gyrotropic material and that the thickness of the dielectric layer is selected to be so small that the transversely attenuated wave generated during total reflection, although passing into the layer of gyrotropic material, does encounter the necessary reflectivity.

3. A laser rotation rate sensor according to claim 2, characterized in that the index of refraction of the gyrotropic material is less than that of the prism aperture.

4. A laser rotation rate sensor according to claim 3, characterized in that the thickness of the gyrotropic layer is greater than the penetration depth of the transversely attenuated wave.

5. A laser rotation rate sensor according to claim 1, characterized in that the layer adjacent the base boundary face of the prism is a triple layer; that the directly adjacent layer portion of the triple layer is made of a dielectric material having an index of refraction that is so much lower than that of the prism material that total reflection occurs at the interface with the dielectric layer; that this first layer of dielectric material is followed by a layer of a gyrotropic material; that the thickness of the first layer is selected in such a manner that the transversely attenuated wave generated during total reflection still passes into the layer of gyrotropic material but does encounter the necessary reflectivity and that this layer of gyrotropic material is followed by a further layer of dielectric material.

6. A laser rotation rate sensor according to claim 5, charcterized in that the index of refraction of the gyrotropic material is greater than that of the prism aperture (20).

7. A laser rotation rate sensor according to claim 1, characterized in that, due to adherence to the Brewster condition, almost no reflection occurs when light enters the prism at the two lateral faces 5(b).

8. A laser rotation rate sensor according to claim 2, characterized in that, due to adherence to the Brewster condition, almost no reflection occurs when light enters the prism at the two lateral faces.

9. A laser rotation rate sensor according to claim 3, characterized in that, due to adherence to the Brewster condition, almost no reflection occurs when light enters the prism at the two lateral faces.

10. A laser rotation rate sensor according to claim 4, characterized in that, due to adherence to the Brewster condition, almost no reflection occurs when light enters the prism at the two lateral faces.

11. A laser rotation rate sensor according to claim 5, characterized in that, due to adherence to the Brewster condition, almost no reflection occurs when light enters the prism at the two lateral faces.

12. A laser rotation rate sensor according to claim 6, characterized in that, due to adherence to the Brewster condition, almost no reflection occurs when light enters the prism at the two lateral faces.

13. A laser rotation rate sensor, comprising:

an optical amplifier having first and second opposite ends for emitting first and second beams of light, said first and second beams of light travelling in opposite directions around a closed optical path;

an optical detector;

a magneto-optic reflector positioned in the path of said first laser beam, said reflector including

- a prism having a given index of refraction, said prism having at least first and second surfaces, and
- a gyrotropic layer having first and second opposing surfaces, said first surface being affixed to the second surface of said prism, the index of refraction of said gyrotropic layer being less than the index of refraction of said prism, said first laser beam impinging at the Brewster angle on the first surface of said prism, being totally reflected at the second surface of said prism and being emitted as an output beam from said reflector, a magnetic field being impressed on said magnetooptic reflector in a direction perpendicular to the first surface of said gyrotropic layer and to the plane of said first laser beam; and optical means transmitting the output beam from said reflector and said second laser beam to said optical detector, the output of said optical detector corresponding to the difference in frequency between said first and second beams of light.

14. A laser rotation rate sensor according to claim 13, which further comprises a dielectric layer interposed between said prism and the first surface of said gyrotropic layer, the index of refraction of said dielectric layer being less than the index of refraction of said prism.

15. A laser rotation rate sensor according to claim 14, which further comprises a second dielectric layer affixed to the second surface of said gyrotropic layer.

* * * * *